US011914998B2

(12) United States Patent
Chen

(10) Patent No.: US 11,914,998 B2
(45) Date of Patent: Feb. 27, 2024

(54) PROCESSOR CIRCUIT AND DATA PROCESSING METHOD FOR LOAD INSTRUCTION EXECUTION

(71) Applicant: REALTEK SEMICONDUCTOR CORPORATION, Hsinchu (TW)

(72) Inventor: Chia-I Chen, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 34 days.

(21) Appl. No.: 17/731,213

(22) Filed: Apr. 27, 2022

(65) Prior Publication Data
US 2023/0020505 A1 Jan. 19, 2023

(30) Foreign Application Priority Data
Jul. 15, 2021 (TW) .................................. 110126028

(51) Int. Cl.
*G06F 9/30* (2018.01)
*G06F 9/38* (2018.01)

(52) U.S. Cl.
CPC ...... *G06F 9/30145* (2013.01); *G06F 9/30043* (2013.01); *G06F 9/30105* (2013.01); *G06F 9/3802* (2013.01); *G06F 9/3834* (2013.01)

(58) Field of Classification Search
None
See application file for complete search history.

(56) References Cited

U.S. PATENT DOCUMENTS 6,701,425 B1* 3/2004 Dabbagh ............... G06F 9/3834
712/225
6,836,831 B2* 12/2004 Borkenhagen ...... G06F 13/1647
711/169
7,376,816 B2* 5/2008 Barrick ................... G06F 9/383
712/217

(Continued)

FOREIGN PATENT DOCUMENTS

TW 201232394 A1 8/2012

OTHER PUBLICATIONS

Machine Translation for Chinese Patent Application CN 113157631 A, Date Filed Jan. 22, 2020. (Year: 2020).*

(Continued)

*Primary Examiner* — Steven G Snyder
(74) *Attorney, Agent, or Firm* — WPAT, P.C.; Anthony King

(57) ABSTRACT

A processor circuit includes an instruction decode unit, an instruction detector, an address generator and a data buffer. The instruction decode unit is configured to decode a first load instruction included in a plurality of load instructions to generate a first decoding result. The instruction detector, coupled to the instruction decode unit, is configured to detect if the load instructions use a same register. The address generator, coupled to the instruction decode unit, is configured to generate a first address requested by the first load instruction according to the first decoding result. The data buffer is coupled to the instruction detector and the address generator. When the instruction detector detects that the load instructions use the same register, the data buffer is configured to store the first address generated from the address generator, and store data requested by the first load instruction according to the first address.

20 Claims, 7 Drawing Sheets

(56) References Cited

U.S. PATENT DOCUMENTS

| | | | | |
|---|---|---|---|---|
| 7,730,290 B2* | 6/2010 | Barrick | G06F 9/383 | |
| | | | 712/225 | |
| 8,392,757 B2* | 3/2013 | Ramani | G06F 9/3834 | |
| | | | 714/15 | |
| 10,310,988 B2* | 6/2019 | Lloyd | G06F 9/384 | |
| 10,324,856 B2* | 6/2019 | Lloyd | G06F 9/3834 | |
| 10,417,002 B2* | 9/2019 | Lloyd | G06F 9/30043 | |
| 10,534,616 B2* | 1/2020 | Gonzalez | G06F 9/3855 | |
| 10,606,591 B2* | 3/2020 | Lloyd | G06F 9/30043 | |
| 10,606,592 B2* | 3/2020 | Lloyd | G06F 9/3824 | |
| 10,963,248 B2* | 3/2021 | Lloyd | G06F 9/3832 | |
| 10,977,047 B2* | 4/2021 | Lloyd | G06F 9/3802 | |
| 11,385,894 B2* | 7/2022 | Lu | G06F 9/3834 | |
| 2009/0240919 A1* | 9/2009 | Alexander | G06F 9/3826 | |
| | | | 712/214 | |
| 2011/0161632 A1* | 6/2011 | Sha | G06F 9/3826 | |
| | | | 712/E9.028 | |
| 2017/0091097 A1* | 3/2017 | Waugh | G06F 12/1027 | |
| 2017/0293567 A1* | 10/2017 | Bryant | G06F 12/0831 | |
| 2019/0108022 A1* | 4/2019 | Lloyd | G06F 12/1009 | |
| 2019/0108025 A1* | 4/2019 | Lloyd | G06F 12/1027 | |
| 2019/0108034 A1* | 4/2019 | Lloyd | G06F 9/34 | |
| 2019/0108035 A1* | 4/2019 | Gonzalez | G06F 9/3855 | |
| 2019/0108132 A1* | 4/2019 | Lloyd | G06F 9/32 | |
| 2019/0108133 A1* | 4/2019 | Lloyd | G06F 12/0292 | |
| 2019/0310858 A1* | 10/2019 | Lloyd | G06F 9/30043 | |
| 2020/0174931 A1* | 6/2020 | Williams | G06F 12/084 | |
| 2020/0183689 A1* | 6/2020 | Lloyd | G06F 9/30043 | |
| 2021/0216322 A1* | 7/2021 | Lu | G06F 9/3836 | |

OTHER PUBLICATIONS

Machine Translation for Japanese Patent Application JP 2016066218 A, Date Filed Sep. 24, 2014. (Year: 2014).*

Pipeline Stalls' from Computer Organization II, Virginia Tech (VT), copyright 2005-2013. (Year: 2013).*

English Abstract of TW201232394A1.

* cited by examiner

| | | | |
|---|---|---|---|
| instr.0 | ibuf.0 | load r0, [r8] | lu_instr = 1 |
| instr.1 | ibuf.1 | --- | lu_instr = 0 |
| ⋮ | | ⋮ | |
| instr.(k-1) | ibuf.(k-1) | --- | lu_instr = 0 |
| instr.k | ibuf.k | load r1, [r8] | lu_instr = 1 |
| instr.(k+1) | ibuf.(k+1) | --- | lu_instr = 0 |
| ⋮ | | ⋮ | |
| instr.(n-1) | ibuf.(n-1) | --- | lu_instr = 0 |
| instr.n | ibuf.n | load r2, [r8] | lu_instr = 1 |

| | | | |
|---|---|---|---|
| instrL.0 | ibuf.0 | load r0, 0[r8] | 0x4000 |
| instrL.1 | ibuf.1 | load r1, 4[r8] | 0x4004 |
| instrL.2 | ibuf.2 | load r2, 8[r8] | 0x4008 |
| instrL.3 | ibuf.3 | load r3, 12[r8] | 0x400c |
| instrL.4 | ibuf.4 | load r4, 16[r8] | 0x4010 |

PROCESSOR CIRCUIT AND DATA PROCESSING METHOD FOR LOAD INSTRUCTION EXECUTION

BACKGROUND

The present disclosure relates to data processing and, more particularly, to a processor circuit capable of reducing stall cycles caused by cache access, and a data processing method.

In order to reduce the time for accessing data or instructions in a lower speed memory, central processing units (CPUs) nowadays utilize a cache mechanism in order to obtain required data or instructions within a few clock cycles. However, in some cases where data required by a manipulation instruction is data to be read by a load instruction just received, the CPU still needs to wait several clock cycles to execute the manipulation instruction because it takes a period of time to access the data to be read from a local memory or a cache memory, such as a static random access memory (SRAM). This causes a load-use stall. In addition, the CPU may utilize superscalar architecture to increase throughput. The superscalar architecture can issue/decode multiple instructions within a clock cycle. However, when the instructions include a plurality of load instructions, each load instruction and a corresponding manipulation instruction would still cause a load-use stall, thus degrading system performance.

SUMMARY

The described embodiments therefore provide circuits and methods capable of reducing pipeline stalls associated with one or more load instructions.

Some embodiments described herein include an exemplary processor circuit. The processor circuit includes an instruction decode unit, an instruction detector, an address generator and a data buffer. The instruction decode unit is configured to decode a first load instruction included in a plurality of load instructions to generate a first decoding result. The instruction detector, coupled to the instruction decode unit, is configured to detect if the load instructions use a same register. The address generator, coupled to the instruction decode unit, is configured to generate a first address requested by the first load instruction according to the first decoding result. The data buffer is coupled to the instruction detector and the address generator. The data buffer is configured to, when the instruction detector detects that the load instructions use the same register, store the first address generated from the address generator, and store data requested by the first load instruction according to the first address.

Some embodiments described herein include an exemplary a data processing method. The data processing method includes the following steps: receiving a plurality of load instructions, and detecting if the load instructions use a same register; decoding a first load instruction included in the load instructions to generate a first decoding result; generating a first address requested by the first load instruction according to the first decoding result; when it is detected that the load instructions use the same register, storing the first address in a data buffer; and storing data requested by the first load instruction in the data buffer according to the first address.

BRIEF DESCRIPTION OF THE DRAWINGS

Aspects of the present disclosure are best understood from the following detailed description when read with the accompanying figures. It should be noted that, in accordance with the standard practice in the field, various features are not drawn to scale. In fact, the dimensions of the various features may be arbitrarily increased or reduced for clarity of discussion.

FIG. 3A is an implementation of instruction detection associated with the instruction detector shown in FIG. 2 in accordance with some embodiments of the present disclosure.

FIG. 3B is another implementation of instruction detection associated with the instruction detector shown in FIG. 2 in accordance with some embodiments of the present disclosure.

DETAILED DESCRIPTION

Figure 1:
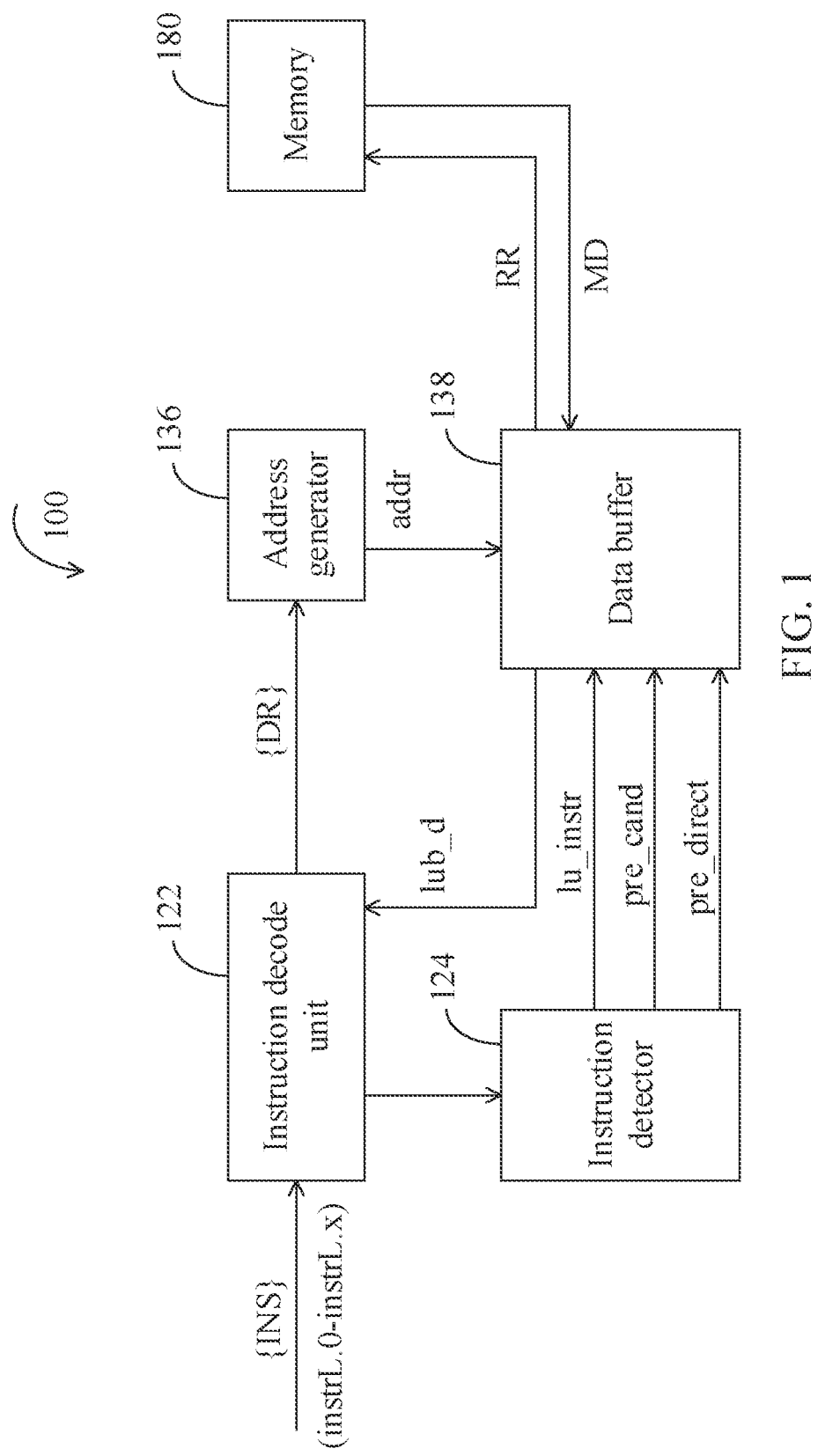
FIG. 1 is a block diagram illustrating an exemplary processor circuit in accordance with some embodiments of the present disclosure.

The following disclosure provides various embodiments or examples for implementing different features of the present disclosure. Specific examples of components and arrangements are described below to simplify the present disclosure. These are, of course, merely examples and are not intended to be limiting. For example, when an element is referred to as being "connected to" or "coupled to" another element, it may be directly connected to or coupled to the other element, or intervening elements may be present.

In addition, reference numerals and/or letters may be repeated in various examples of the present disclosure. This repetition is for the purpose of simplicity and clarity and does not in itself dictate a relationship between the various embodiments and/or configurations discussed. Furthermore, as could be appreciated, the present embodiments provide many ideas that can be widely applied in various scenarios. The following embodiments are provided for illustration purposes, and shall not be used to limit the scope of the present disclosure.

By preparing in advance the data needed by one or more pending instructions, i.e. one or more instructions to be processed, the proposed data processing scheme can reduce/avoid a load-use stall caused by execution of the one or more pending instructions. For example, in superscalar CPU architecture in which load instructions are issued/decoded all at once within the same clock cycle, the proposed data processing scheme can determine whether the load instructions are likely to cause a load-use stall. When it is determined that the load instructions are likely to cause a load-use stall, the proposed data processing scheme can prepare in advance the data needed by the load instructions, thereby successfully executing all instructions, e.g. all of the manipulation instructions which are issued/decoded at the same time as the load instructions, without waiting for a return of an execution result of each load instruction. As a result, the proposed data processing scheme can reduce a stall latency caused by cache access. The proposed data processing scheme can further prepare in advance the data pointed to by a neighboring address adjacent to an address requested by the load instructions, thus increasing a hit rate of a data buffer provided by the proposed data processing scheme. Further description is provided below.

FIG. 1 is a block diagram illustrating an exemplary processor circuit 100 in accordance with some embodiments of the present disclosure. The processor circuit 100 can be used to reduce/avoid a load-use stall caused by execution of one or some instructions in an instruction stream. The processor circuit 100 may include, but is not limited to, an instruction decode unit 122, an instruction detector 124, an address generator 136 and a data buffer 138. The instruction decode unit 122 is configured to decode a plurality of instructions {INS} to generate a plurality of decoding results {DR}. For example, the instruction decode unit 122 can be configured to decode a load instruction included in the instructions {INS} to thereby generate a corresponding decoding result. As another example, the instruction decode unit 122 can be configured to decode other instructions included in the instructions {INS}, such as a store instruction or a manipulation instruction, to thereby generate corresponding decoding results. In the present embodiment, the instructions {INS} may be a plurality of instructions received by the processor circuit 100 within a plurality of consecutive clock cycles. The processor circuit 100 can fetch one or more instructions within a single clock cycle. By way of example but not limitation, the processor circuit 100 can employ superscalar CPU architecture. The instruction decode unit 122 can receive or decode a portion or all of the instructions (INS) within a plurality of consecutive clock cycles.

The instruction detector 124, coupled to the instruction decode unit 122, is configured to detect if the instructions {INS} are likely to cause a load-use stall. In the present embodiment, the instruction detector 124 can determine whether the instructions {INS} are likely to cause a load-use stall by detecting if the instructions {INS} includes a load-use pattern. The load-use pattern may be, but is not limited to, a plurality of load instructions using a same register. In other words, the instruction detector 124 can detect if the instructions {INS} includes a plurality of load instructions using the same register. When detecting that the instructions {INS} includes a plurality of load instructions using the same register, i.e. the instructions {INS} includes the load-use pattern, the instruction detector 124 can determine that the instructions {INS} are likely to cause a load-use stall.

For example, the instructions {INTS} may include a plurality of load instructions instrL.0-instrL.x, where x is a positive integer greater than one, A load instruction included in the load instructions instrL.0-instrL.x may be a load-use instruction, which may cause a load-use stall if the processor circuit 100 uses an execution result of the load instruction to execute a subsequent instruction. The processor circuit 100 can reduce a load-use stall by preparing in advance the data needed by the subsequent instruction, which includes data requested by the load instruction, rather than waiting for a return of an execution result of the load instruction. However, in some cases where the instruction decode unit 122 concurrently or substantially concurrently receive/decode the load instructions instrL.0-instrL.x, if the processor circuit 100 has to perform cache access in response to each load instruction so as to prepare data needed by an instruction subsequent to the load instruction, a load-use stall would still occur in the processor circuit 100. For example, the load instructions instrL.0-instrL.x which are concurrently decoded by the instruction decode unit 122 may use a same register. Subsequent instructions which are respectively associated with the load instructions instrL.0-instrL.x may request the same data or request data items corresponding to adjacent addresses. If the processor circuit 100 performs cache access in response to each load instruction, data pointed to by the same register in a memory, e.g. a cache memory, has to be accessed repeatedly, thus increasing a stall cycle caused by the cache access. In other words, when detecting that the load instructions instrL.0-instrL.x uses a same register, the instruction detector 124 can determine that the instructions {INS} are likely to cause a load-use stall. Each of the load instructions instrL.0-instrL.x can be regarded as a load-use instruction.

In addition, the instruction detector 124 can be configured to output an indication signal lu_instr, which can indicate if an instruction detected by the instruction detector 124 is a load-use instruction. For example, when an instruction detected by the instruction detector 124 is one of a plurality of load instructions using a same register, e.g. one of the load instructions instrL.0-instrL.x, the instruction detector 124 can output an indication signal lu_instr having a predetermined signal level, which means that the detected instruction is a load-use instruction. In the present embodiment, the instruction detector 124 can receive the instructions {INS} temporarily stored in the instruction decode unit 122 to thereby detect the instructions {INS} In some embodiments, the instruction detector 124 may receive the instructions {INS} directly, rather than from the instruction decode unit 122, to perform detection.

The address generator 136, coupled to the instruction decode unit 122, is configured to generate an address associated with each instruction according to a decoding result of the instruction. For example, the address generator 136 can generate an address addr according to a decoding result of a load instruction included in the load instructions instrL.0-instrL.x. The address addr serves as an address requested by the load instruction.

The data buffer 138 is coupled to the instruction detector 124 and the address generator 136. The data buffer 138 is configured to, when the instruction detector 124 detects that the load instructions instrL.0-instrL.x use a same register, store the address addr generated from the address generator 136, and store data lub_d according to the address addr. The data lub_d is the data requested by at least one of the load instructions instrL.0-instrL.x.

For example, in operation, the instruction detector 124 may detect the instructions {INS} to determine whether the instructions {INS} include a plurality of load instructions using a same register. When it is detected that the load instructions instrL.0-instrL.x included in the instructions {INS} use a same register, and data requested by the load instructions instrL.0-instrL.x is not stored in the data buffer 138, the data buffer 138 can send a read request RR to a memory 180 so as to read the data MD pointed to by the address addr in the memory 180. The address addr is provided by the address generator 136 according to a decoding result of the load instruction instrL.0. The memory 180 can be a local memory or a cache memory of the processor circuit 100. Alternatively, the memory 180 can be an external memory or an auxiliary memory which is external to the processor circuit 100. In some cases where the load instructions instrL.0-instrL.x, which use the same register, request the same address, the load instructions instrL.0-instrL.x may request the sane data such as the data lub_d provided for the instruction decode unit 122. As a result, the data MD can serve as not only the data requested by the load instruction instrL.0, but also the data requested by other load instructions such as the load instruction instrL.1. The data buffer 138 can obtain the data requested by the load instruction instrL.1 without accessing the memory 180 again, thus reducing a stall cycle caused by cache access.

It is worth noting that, in a case where the load instructions instrL.0-instrL.x using the same register request different addresses, the proposed data processing scheme can still reduce the number of times that cache access is performed. For example, the same register shared by the load instructions instrL.0-instrL.x may be a base register. Each load instruction can use the base register and a corresponding address offset for addressing. The instruction detector 124 can determine whether the instructions {INS} are likely to cause a load-use stall by detecting if the instructions {INS} include a load-use pattern. The load-use pattern may be a plurality of load instructions using a same base register, in which respective address offsets exhibit a predetermined trend of change. When detecting that the instructions {INS} has the load-use pattern, the instruction detector 124 can generate an indication signal pre_cand and an indication signal pre_direct. The indication signal pre_cand can indicate whether a load instruction detected by the instruction detector 124 is a prefetch candidate. The indication signal pre_direct can indicate the predetermined trend of change. When the load instruction detected by the instruction detector 124 is a prefetch candidate, the data buffer 138 can access data requested by at least one load instruction, different from the load instruction, included in the load instructions from the memory 180.

In the present embodiment, the instruction detector 124 can detect a trend of change in respective address offsets of the load instructions instrL.0-instrL.x, thereby determining whether the load instruction instrL.0 is a prefetch candidate. When detecting that the trend of change is a predetermined trend of change, e.g. an ascending trend or a descending trend, the instruction detector 124 can determine that the load instruction instrL.0 is the prefetch candidate. The data buffer 138 can be configured to, when the load instruction instrL.0 serves as the prefetch candidate, read data requested by at least one load instruction, different from the load instruction instrL.0, included in the load instructions instrL.0-instrL.x from the memory 180. For example, the data buffer 138 can send the read request RR to the memory 180 according to the address addr, and accordingly read the data MD pointed to by the address addr in the memory 180. The address addr is provided by the address generator 136 according to a decoding result of the load instruction instrL.0. In addition, the data buffer 138 can access the data pointed to by the load instruction instrL.x from the memory 180 according to the indication signals pre_cand and pre_direct. The data buffer 138 can obtain the data requested by the load instruction instrL.x without accessing the memory 180 again. In other words, although the load instructions instrL.0-instrL.x using the same base register may request different addresses because of different address offsets and therefore request different data contents, the proposed data processing scheme can reduce a load-use stall caused by cache access without waiting for a return of an execution result of each load instruction.

For illustrative purposes, the proposed data processing scheme is described below with reference to a processor circuit utilizing pipeline architecture. However, this is not intended to limit the scope of the present disclosure. The proposed data processing scheme can be employed to other circuit structures, each of which uses an execution result of a previous instruction to execute a subsequent instruction, without departing from the scope of the present disclosure.

Figure 2:
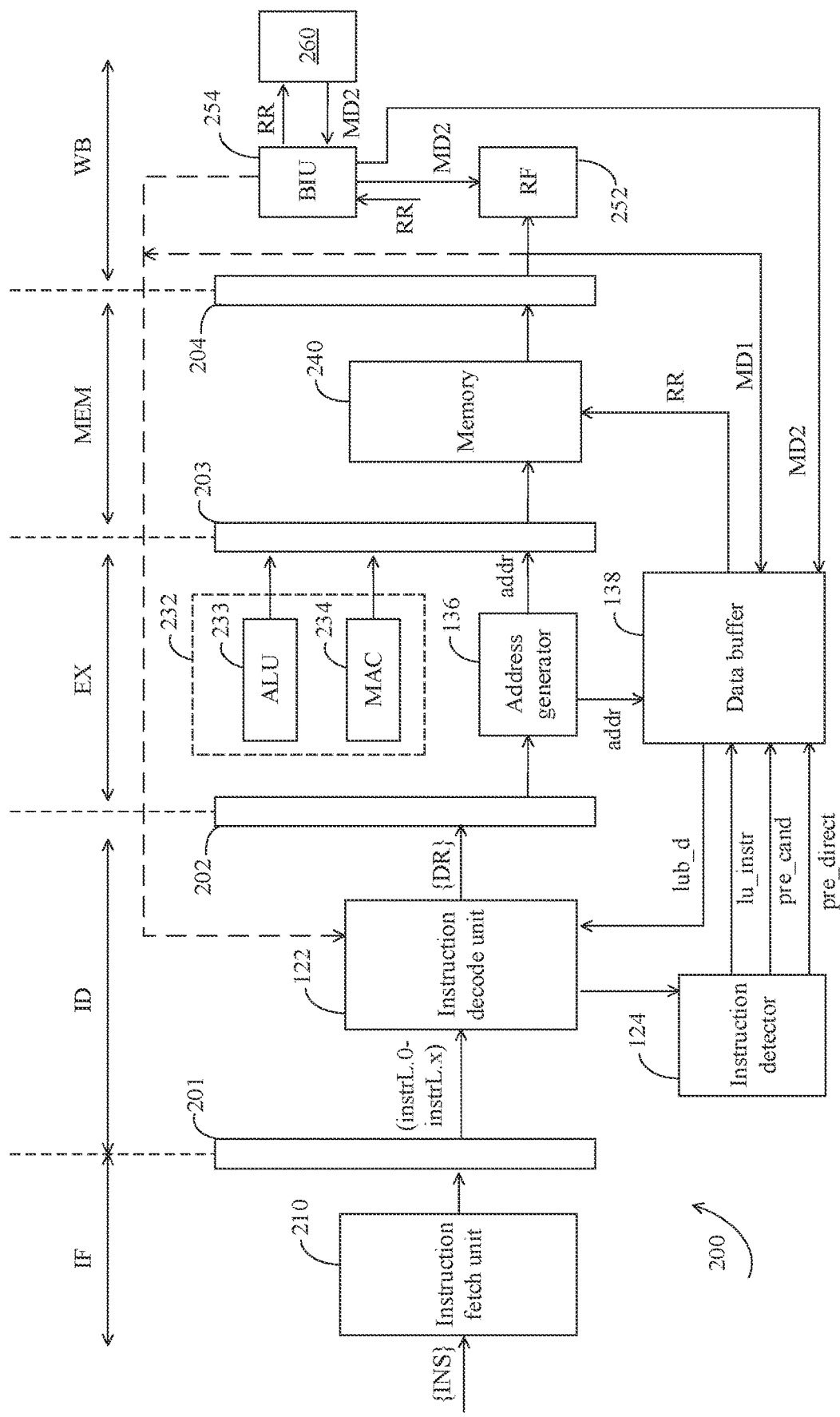
FIG. 2 is an implementation of the processor circuit shown in FIG. 1 in accordance with some embodiments of the present disclosure.

FIG. 2 is an implementation of the processor circuit 100 shown in FIG. 1 in accordance with some embodiments of the present disclosure. The processor circuit 200 can be implemented as a pipelined processor having pipeline architecture. The pipeline architecture may include five pipeline stages, which can be implemented using an instruction fetch stage IF, an instruction decode stage ID, an execution stage EX, a memory access stage MEM and a write back stage WB, respectively. However, this is not intended to limit the scope of the present disclosure. In some embodiments, the five pipeline stages can be implemented using an instruction fetch stage, an instruction decode stage, an operand fetch stage, an execution stage and a write back stage. In some embodiments, the processor circuit 200 can use pipeline architecture which has more or less than five pipeline stages. Such modifications and alternatives also fall within the spirit and scope of the present disclosure.

In the present embodiment, the processor circuit 200 may include the instruction decode unit 122, the instruction detector 124, the address generator 136 and the data buffer 138 shown in FIG. 1. The instruction decode unit 122 and the instruction detector 124 can be located in a same pipeline stage such as the instruction decode stage ID. The address generator 136 and the data buffer 138 can be located in a same pipeline stage such as the execution stage EX. Pipeline stalls can be reduce/avoid accordingly. Associated description will be provided later.

In addition, the processor circuit 200 may include, but is not limited to, a plurality of pipeline registers 201-204, an instruction fetch unit 210, an execution unit 232, a memory 240, a register file (RF) 252 and a bus interface unit (BIU) 254. The pipeline register 201 can be referred to as an IF/ID register because of being located between the instruction fetch stage IF and the instruction decode stage ID. Similarly, the pipeline register 202, the pipeline register 203 and the pipeline register 204 can be referred to as an ID/EX register, an EX/MEM register and a MEM/WB register, respectively.

The instruction fetch unit 210, located in the instruction fetch stage IF, is configured to store the instructions {INTS}, and store one or more instructions included in the instructions {INS} into the pipeline register 201 according to an address provided by a program counter (not shown in FIG. 2).

The execution unit 232, located in the execution stage EX, is configured to execute an instruction according to a decoding result of the instruction provided by the pipeline register 202, and store an execution result of the instruction into the pipeline register 203. The decoding result of the instruction may include an address and data needed for execution of the instruction. In the present embodiment, the execution unit 232 may include, but is not limited to, an arithmetic logic unit (ALU) 233 and a multiplier-accumulator unit (MAC) 234.

The memory 240, located in the memory access stage MEM, can serve as an embodiment of the memory 180 shown in FIG. 1. For example, the memory 240 can be implemented as a cache memory of the processor circuit 200. In the present embodiment, the memory 240 is configured to perform a memory access operation according to an instruction execution result provided by the pipeline register 203. For example, during a write operation, the memory 240 can store data at a location pointed to by the address addr according to the instruction execution result. As another example, during a read operation, the memory 240 can output the data MD1 pointed to by the address addr according to the instruction execution result.

Each of the register file 252 and the bus interface unit 254 can be located in the write back stage WB. The register file 252 is configured to store data, which comes from the memory 240 and is temporarily stored in the pipeline register 204. The bus interface unit 254 can serve as a data transmission interface between the processor circuit 200 and an external memory 260. In some embodiments, the register file 252 can be further configured to store data which is to be written into the external memory 260, or store data MD2 read from the external memory 260.

Referring to FIG. 3A and also to FIG. 2, an implementation of instruction detection associated with the instruction detector 124 shown in FIG. 2 is illustrated in FIG. 3A in accordance with some embodiments of the present disclosure. In the present embodiment, the instructions {INS} detected by the instruction detector 124 include a plurality of instructions instr.0-instr.n, where n is an integer greater than one. The instructions instr.0-instr.n can be temporarily stored in a plurality of storage units ibuf.0-ibuf.n of the instruction detector 124, respectively. The instruction detector 124 can be configured to detect if the instructions instr.0-instr.n include a plurality of load instructions using a same register. For example, the instructions instr.0, instr.k and instr.n may be load instructions, and serve as at least a portion of the load instructions instrL.0-instrL.x shown in FIG. 2, where x can be equal to or greater than 3, and k is an integer between 1 and n. In the embodiment shown in FIG. 3A, the instruction instr.0 is used for loading the data, which is pointed to by the address [r8] (an address temporarily stored in the register r8) in the memory 240, from the memory 240 into the register r0. The instruction instr.k is used for loading the data, which is pointed to by the address [r8] in the memory 240, from the memory 240 into the register r1. The instruction instr.n is used for loading the data, which is pointed to by the address [r8] in the memory 240, from the memory 240 into the register r2 Thus, in the instruction decode stage ID, the instruction detector 124 can detect that the instructions instr.0, instr.k and instr.n use the same register r8. The instruction detector 124 can output an indication signal lu_instr having a predetermined signal level, e.g. a logic high level, to indicate that the instruction instr.0/instr.k/instr.n is a load-use instruction.

After the instruction detector 124 detects that each of the instructions instr.0, instr.k and instr.n uses the register r8, the data requested by the instructions instr.0, instr.k and instr.n can be provided to the instruction decode unit 122 by the data buffer 138 in the next pipeline stage, i.e. the execution stage EX. Thus, the data needed by a next instruction following the instruction instr.0/instr.k/instr.n may have been ready when the next instruction enters the instruction decode stage ID. In addition, even if the instruction decode unit 122 receives/decodes the instructions instr.0, instr.k and instr.n within the same clock cycle, the data buffer 138 may obtain the data requested by the instructions instr.0, instr.k and instr.n without repeatedly accessing the memory 240. For example, when the data requested by the instructions instr.0, instr.k and instr.n has not been stored in the data buffer 138, the data buffer 138 can send the read request RR to the memory 240 according to the address addr, and accordingly read the data MD1 pointed to by the address [r8] in the memory 240. The address addr is provided by the address generator 136 according to a decoding result of one of the instructions instr.0, instr.k and instr.n. The data MD1 serves as the data requested by each of the instructions instr.0, instr.k and instr.n. In the present embodiment, the data buffer 138 can receive the indication signal lu_instr, indicating that the instruction instr.0 is a load-use instruction, in the execution stage EX. The data buffer 138 may further receive the address addr, which is generated according to the decoding result of the instruction instr.0, in the execution stage EX, and accordingly send the read request RR to the memory 240 to read the data MD1 As the data MD1 is the data requested by the instruction instr.k/instr.n, the data buffer 138 would not access the memory 240 again.

Referring to FIG. 3B and also to FIG. 2, another implementation of instruction detection associated with the instruction detector 124 shown in FIG. 2 is illustrated in FIG. 3D in accordance with some embodiments of the present disclosure. In the present embodiment, the instructions {INS} detected by the instruction detector 124 includes a plurality of load instruction instrL.0-instrL.4, i.e. at least a portion of the load instructions instrL.0-instrL.x shown in FIG. 2. The load instruction instrL.0-instrL.4 can be temporarily stored in the storage units ibuf.0-ibuf.4 in the instruction detector 124, respectively. Each load instruction uses a base register and a corresponding address offset for addressing. The instruction detector 124 can decode the load instruction instrL.0-instrL.4 to thereby detect whether the load instruction instrL.0-instrL.4 use a same base register.

In the embodiment shown in FIG. 313, the load instruction instrL.0 is used for loading the data, which is pointed to by the address [r8] plus the address offset "0" in the memory 240, from the memory 240 into the register r0. The instruction instrL.1 is used for loading the data, which is pointed to by the address [r8] plus the address offset "4" in the memory 240, from the memory 240 into the register r1 The instruction instrL.2 is used for loading the data, which is pointed to by the address [r8] plus the address offset "8" in the memory 240, from the memory 240 into the register r2. The instruction instrL.3 is used for loading the data, which is pointed to by the address [r8] plus the address offset "12" in the memory 240, from the memory 240 into the register r3. The instruction instrL.4 is used for loading the data, which is pointed to by the address [r8] plus the address offset "16" in the memory 240, from the memory 240 into the register r4. For example, the address requested by the load instruction instrL.0 may be, but is not limited to, 0x4000 (a hexadecimal value). The address requested by the load instruction instrL 1 may be, but is not limited to, 0x4004. The address requested by the load instruction instrL.2 may be, but is not limited to, 0x4008. The address requested by the load instruction instrL.3 may be, but is not limited to, 0x400c. The address requested by the load instruction instrL.4 may be, but is not limited to, 0x4010. Thus, in the instruction decode stage ID, the instruction detector 124 can detect that the load instruction instrL.0-instrL.4 use the same register r8, i.e. a base register. The instruction detector 124 can output an indication signal lu_instr having a predetermined signal level, e.g. a logic high level, to indicate that the load instruction instrL.0/instrL.1/instrL.2/instrL.3/instrL.4 is a load-use instruction.

Furthermore, the instruction detector 124 can detect a trend of change in respective address offsets of the load instructions instrL.0-instrL.4, thereby determining whether one of the load instructions instrL.0-instrL.4 is a prefetch candidate. When one of the load instructions instrL.0-instrL.4 is a prefetch candidate, the data buffer 138 can read the data requested by at least one load instruction included in the load instructions instrL.0-instrL.4 from the memory 240. The at least one load instruction is different from the prefetch candidate. The data buffer 138 does not need to repeatedly access the memory 240 in response to each load instruction.

For example, in the instruction decode stage ID, the instruction detector 124 can detect that the trend of change is an ascending trend with respect to the load instruction instrL.0, which has a smallest address offset among the load instructions instrL.0-instrL.4. The instruction detector 124 can therefore determine that the load instruction instrL.0 is a prefetch candidate. The instruction detector 124 may output the indication signal pre_cand having a predetermined signal level, e.g. a logic high level, to indicate that the load instruction instrL.0 is a prefetch candidate. Also, the instruction detector 124 may output the indication signal pre_direct having a predetermined signal level, e.g. a logic high level, to indicate that the trend of change is an ascending trend. In a next pipeline stage, i.e. the execution stage EX, the address generator 136 generate the address addr according to the decoding result of the load instruction instrL.0. Besides reading the data requested by the load instruction instrL.0 (a part of the data MD1) from the memory 240, the data buffer 138 can read in advance the data requested by at least one load instruction included in the load instructions instrL.1-instrL.4 (another part of the data MD1) from the memory 240 according to the address addr and the trend of change (indicated by the indication signal pre_direct). Thus, the data buffer 138 can obtain the data requested by the at least one load instruction without repeatedly accessing the memory 240.

The above description is provided for illustrative purposes only, and is not intended to limit the scope of the present disclosure. In some embodiments, when detecting that the trend of change in respective address offsets of the load instruction instrL.0-instrL.4 is a descending trend, the instruction detector 124 can determine that one of the load instruction instrL.0-instrL.4 is a prefetch candidate. For example, the instruction detector 124 may detect that the trend of change is a descending trend with respect to the load instruction instrL.4, which has a largest address offset among the load instructions instrL.0-instrL.4. The instruction detector 124 can therefore determine that the load instruction instrL.4 is a prefetch candidate. The instruction detector 124 may output the indication signal pre_cand having a predetermined signal level, e.g. a logic high level, to indicate that the load instruction instrL.4 is a prefetch candidate. Also, the instruction detector 124 may output the indication signal pre_direct having a predetermined signal level, e.g. a logic high level, to indicate that the trend of change is a descending trend. In a next pipeline stage, i.e. the execution stage EX, the address generator 136 generate the address addr according to the decoding result of the load instruction instrL.4. Besides reading the data requested by the load instruction instrL.4 (a part of the data MD1) from the memory 240, the data buffer 138 can read in advance the data requested by at least one load instruction included in the load instructions instrL.0-instrL.3 (another part of the data MD1) from the memory 240 according to the address addr and the trend of change (indicated by the indication signal pre_direct).

In some embodiments, when the instruction detector 124 determines that a load instruction included in the load instruction instrL.0-instrL.4 is a prefetch candidate, the data buffer 138 may count the number of instructions different from the load instructions among the load instructions instrL.0-instrL.4, and accordingly determine a count value of the prefetch candidate. When the count value reaches a threshold, the data buffer 138 can generate a prefetch address according to the address requested by the load instruction and the trend of change, and read the data pointed to by the prefetch address in the memory 240 or the external memory 260. The data pointed to by the prefetch address includes the data requested by one or more load instructions which have not yet been counted. As a result, the data requested by the one or more load instructions which have not yet been counted can be prepared in advance. In some embodiments, the prefetch address may be an address adjacent to the address requested by the load instruction, which may be different from respective addresses requested by the load instruction instrL.0-instrL.4. The data buffer 138 can read the data pointed to by an address, adjacent to the address requested by the load instruction, according to the prefetch address from the memory 240 or the external memory 260, thereby increasing a hit rate of the data buffer 138.

Figure 4:
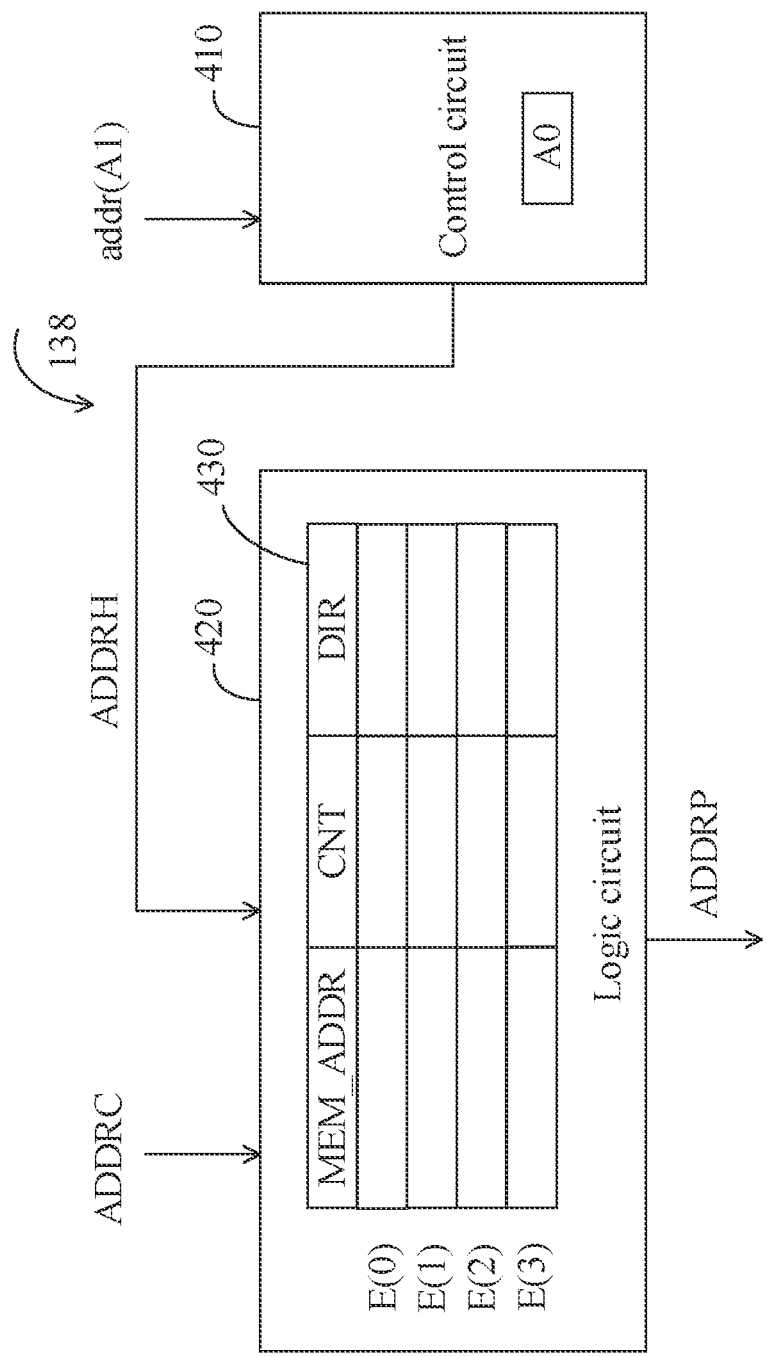
FIG. 4 is an implementation of the data buffer shown in FIG. 2 in accordance with some embodiments of the present disclosure.

Referring to FIG. 4 and also to FIG. 2, an implementation of the data buffer 138 shown in FIG. 2 is illustrated in FIG. 4 in accordance with some embodiments of the present disclosure. In the present embodiment, the data buffer 138 can count the number of instructions using a same register, and selectively read data, which is requested by at least one of the load instructions, in advance. The data buffer 138 may include, but is not limited to, a control circuit 410 and a logic circuit 420. The control circuit 410 is configured to, when the instruction detector 124 detects that the load instructions instrL.0-instrL.x use the same register, store a first address requested by a first load instruction included in the load instructions instrL.0-instrL.x, and store data requested by the first load instruction according to the first address. The first address is the address addr generated by the address generator 136 according to a decoding result of the first load instruction. In addition, the address generator 136 can generate the address addr according to a decoding result of a second load instruction included in the load instructions instrL.0-instrL.x. The generated address addr can serve as a second address requested by the second load instruction. The control circuit 410 can determine whether the second address matches the first address. When the second address matches the first address, the control circuit 410 can output a hit address ADDRH, which can serve as the second address requested by the second load instruction.

For example, when the instruction detector 124 detects that the load instructions instrL.0-instrL.x use the same register, the control circuit 410 can store an address A0 requested by the load instruction instrL.0, and accordingly store the data requested by the load instruction instrL.0. After storing the address A0 requested by the load instruction instrL.0, the control circuit 410 may determine whether the address addr coming from the address generator 136 matches the address A0. When the address addr coming from the address generator 136 is an address A1 requested by the load instruction instrL.1, the control circuit 410 can determine that the address addr coming from the address generator 136 matches the address A0, and output the address A1 which can serve as the hit address ADDRH.

In some embodiments, when the control circuit 410 determines that the second address matches the stored first address, the hit address ADDRH outputted by the control circuit 410 may be the stored first address. For example, in a case where the control circuit 410 has stored the address A0 requested by the load instruction instrL.0, when the control circuit 410 determines that the address addr coming from the address generator 136 (e.g. the address A1 requested by the load instruction instrL.1) matches the address A0, the control circuit 410 can output the address A0 directly, which can serve as the hit address ADDRH.

The logic circuit 420 is coupled to the instruction detector 124, the address generator 136 and the control circuit 410. When the instruction detector 124 determines that the load instructions instrL.0-instrL.x include a prefetch candidate, the logic circuit 420 is configured to store an address ADDRC (which is requested by the prefetch candidate) and a trend of change in respective address offsets of the load instructions instrL.0-instrL.x. In addition, the logic circuit 420 can determine whether the hit address ADDRH outputted by the control circuit 410 matches the address ADDRC requested by the prefetch candidate. When it is determined that the hit address ADDRH matches the address ADDRC requested by the prefetch candidate, the logic circuit can increment a count value of the prefetch candidate.

For example, when the instruction detector 124 determines that the load instruction instrL.0 is a prefetch candidate, the logic circuit 420 may store the address ADDRC requested by the prefetch candidate and the trend of change. The address ADDRC is the address A0 requested by the load instruction instrL.0, i.e. the address addr generated by the address generator 136 according to a decoding result of the load instruction instrL.0. When the hit address ADDRH outputted from the control circuit 410 matches the address A0, the logic circuit 420 may increment a count value of the prefetch candidate. It is worth noting that when the count value of the prefetch candidate reaches a threshold, the logic circuit 420 may read the data, pointed to by an address adjacent to the address A0, from the memory 240 according to the address A0 and the trend of change. The data pointed to by an address adjacent to the address A0 may be the data requested by at least one of the load instruction instrL.0-instrL.4.

In the present embodiment, the logic circuit 420 may include a storage space 430, which can use a flip-flop (no shown in FIG. 4) as a storage unit to complete data access in a single clock cycle. The storage space 430 may multiple entries, which can store information on a prefetch candidate. For illustrative purposes, the storage space 430 shown in FIG. 4 includes four entries E(0)-E(3). However, the storage space 430 can be implemented to include more than or less than four entries without departing from the scope of the present disclosure. Each entry may include, but is not limited to, a candidate address field MEM_ADDR, a counter field CNT and a direction field DIR. The candidate address field MEM_ADDR of each entry can indicate an address requested by a prefetch candidate. The counter field CNT can indicate the number of times the hit address ADDRH matches the address requested by the prefetch candidate. The direction field DIR can indicate a trend of change in address offsets of load instructions related to the prefetch candidate.

Figure 5:
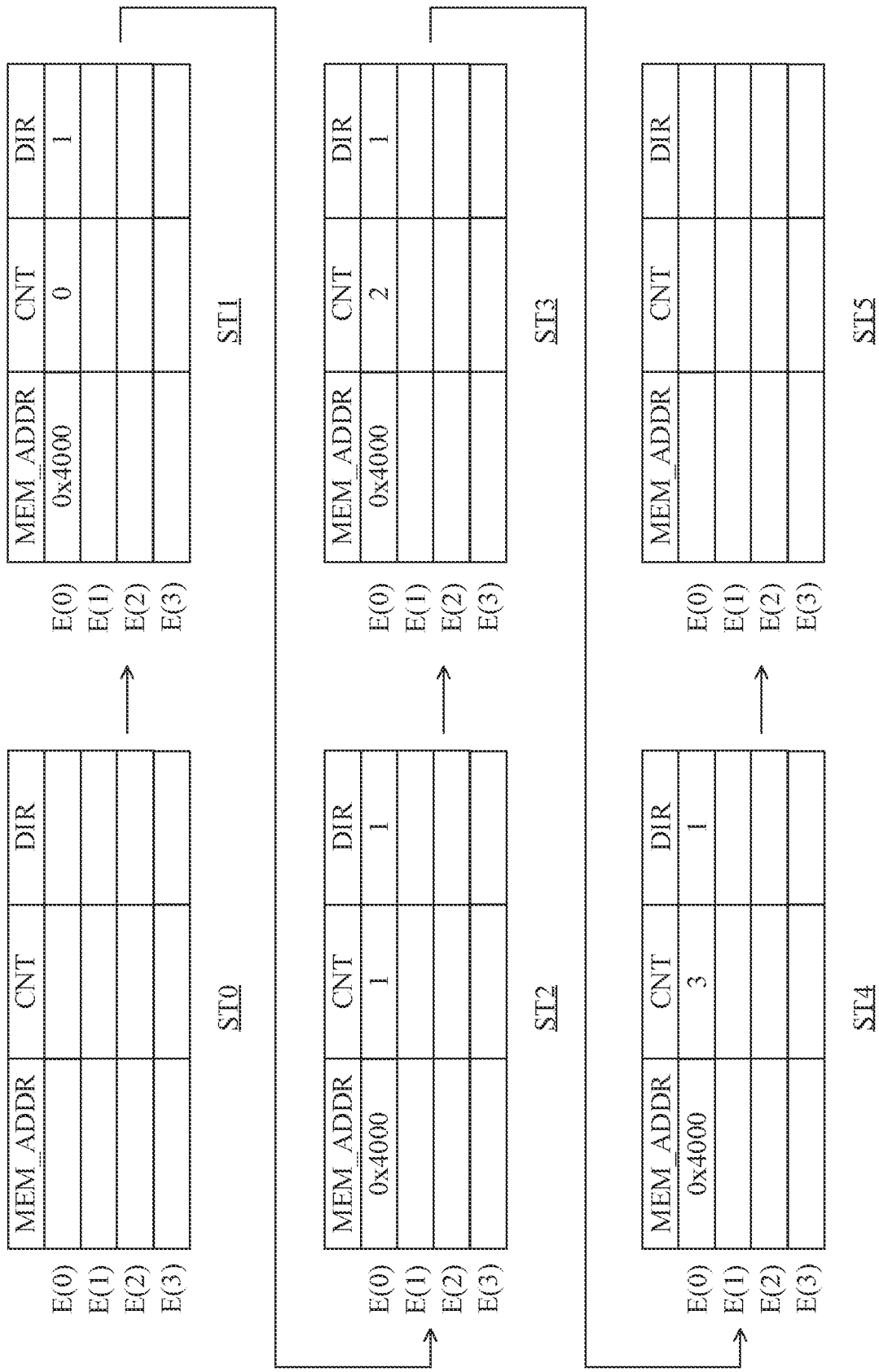
FIG. 5 is a diagram illustrating information stored in the storage space shown in FIG. 4 in a plurality of storage states in accordance with some embodiments of the present disclosure.

FIG. 5 is a diagram illustrating information stored in the storage space 430 shown in FIG. 4 in a plurality of storage states ST0-ST5 in accordance with some embodiments of the present disclosure. Referring to FIG. 3D, FIG. 4 and FIG. 5, in the present embodiment, the information stored in the storage space 430 can be updated according to the load instruction instrL.0-instrL.4 shown in FIG. 3D. Firstly, in the storage state ST0, none of the entries E(0)-E(3) stores information on a prefetch candidate. When the instruction detector 124 determines that the load instruction instrL.0 is a prefetch candidate, the logic circuit 420 can update the information stored in the storage space 430, as shown in the storage state ST1. For example, the logic circuit 420 can store the address A0 requested by the load instruction instrL.0 (i.e. 0x4000) in the candidate address field MEM_ADDR of the entry E(0). The logic circuit 420 can also store a trend of change in the load instruction instrL.0-instrL.4 in the direction field DIR of the entry E(0) according to the indication signal pre_direct. The direction field DIR of the entry E(0) can be set to 1 to indicate an ascending trend. In addition, the logic circuit 420 reset the counter field CNT of the entry E(0) to 0.

In the storage state ST2, the control circuit 410 can determine whether the address addr corning from the address generator 136 matches the address A0. The address addr coming from the address generator 136 is the address A1 requested by the load instruction instrL.1 (i.e. 0x4004). As the addresses A0 and A1 have the same base address, the control circuit 410 can determine that the address addr coming from the address generator 136 matches the address A0, and output the address A1 which can serve as the hit address ADDRH. The logic circuit 420 can determine that the hit address ADDRH matches the 1R content of the candidate address field MEM_ADDR of the entry E(0), thereby incrementing a count value stored in the counter field CNT of the entry E(0). Similarly, in the storage state ST3, the logic circuit 420 can determine that the hit address ADDRH (i.e. the address 0x4008 requested by the load instruction instrL.2) matches the content of the candidate address field MEM_ADDR of the entry E(0), thereby incrementing a count value stored in the counter field CNT of the entry E(0). In the storage state ST4, the logic circuit 420 can determine that the hit address ADDRH (i.e. the address 0x400c requested by the load instruction instrL.3) matches the content of the candidate address field MEM_ADDR of the entry E(0), thereby incrementing a count value stored in the counter field CNT of the entry E(0).

The logic circuit 420 can be configured to determine whether the count value stored in the counter field CNT reaches a threshold. When the count value stored in the counter field CNT reaches the threshold, the logic circuit 420 can generate a prefetch address ADDRP according to the content of the candidate address field MEM_ADDR of the entry E(0) (i.e. the address requested by the prefetch candidate) and the content of the direction field DIR of the entry E(0) (i.e. the trend of change in the load instruction instrL.0-instrL.4). Accordingly, the logic circuit 420 can read the data pointed to by the prefetch address ADDRP in a memory, such as the memory 240 or the external memory 260 shown in FIG. 2. In the present embodiment, the threshold may be set to 3. Thus, in the storage state ST4, the logic circuit 420 can determine that the count value stored in the counter field CNT reaches the threshold, thereby generating the prefetch address ADDRP according to the trend of change in the load instruction instrL.0-instrL.4. The prefetch address ADDRP may be an address adjacent to the address A0. The data buffer 138 can read in advance the data requested by the address adjacent to the address A0, thus increasing a hit rate of the data buffer 138. For example, the prefetch address ADDRP may be the address A0 plus an address offset 12, such that the data buffer 138 can read in advance the data requested by the load instruction instrL.4. As another example, the prefetch address ADDRP may be the address A0 plus an address offset 16, such that the data buffer 138 can read in advance the data requested by an address adjacent to the address A0. Moreover, after generating the prefetch address ADDRP to trigger prefetch operation, the logic circuit 420 may clear the content stored in the entry E(0), as shown in the storage state ST5.

In some embodiments, the data buffer 138 may prefetch the data requested by multiple load instructions. For example, in a case where the threshold is set to 2, the logic circuit 420 may generate an address requested by the load instruction instrL.3 and an address requested by the load instruction instrL.4 according to the address A0 and the trend of change in the load instruction instrL.0-instrL.4. The logic circuit 420 can therefore read in advance the respective data contents requested by the load instructions instrL.3 and instrL.4.

Figure 6:
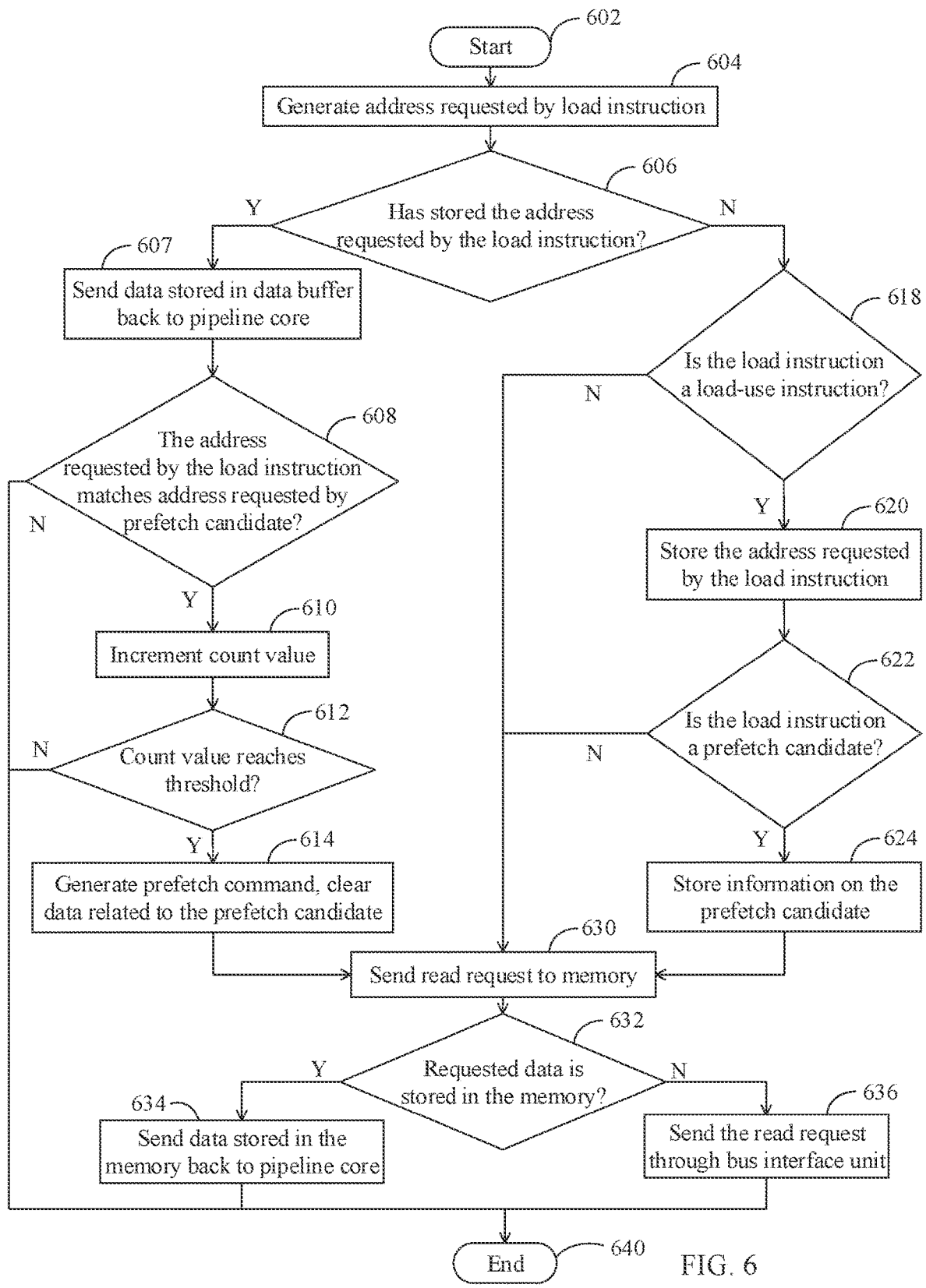
FIG. 6 is a flow chart of an exemplary data processing method associated with the processor circuit shown in FIG. 2 for processing a load instruction in accordance with some embodiments of the present disclosure.

FIG. 6 is a flow chart of an exemplary data processing method associated with the processor circuit 200 shown in FIG. 2 for processing a load instruction in accordance with some embodiments of the present disclosure. In the present embodiment, the data buffer 138 included in the processor circuit 200 shown in FIG. 2 can utilize the architecture shown in FIG. 4 to execute associated operation. Referring to FIG. 2, FIG. 4 and FIG. 6, in step 602, the execution stage EX can begin to execute the load instruction. The load instruction is used for loading read data into a register of the instruction decode unit 122.

In step 604, the address generator 136 can generate the address addr according to a decoding result of the load instruction. The generated address addr is an address requested by the load instruction. Also, the address generator 136 can output the address addr to the data buffer 138. In step 606, the control circuit 410 can check if the address addr has been stored therein. If it is checked that the address addr has been stored in the control circuit 410, the data processing method proceeds to step 607. Otherwise, the data processing method proceeds to step 618.

In step 607, the data buffer 138 can send the data lub_d corresponding to the address addr, or the hit address ADDRH, back to a pipeline core such as the instruction decode unit 122.

In step 608, the control circuit 410 can output the hit address ADDRH, i.e. the address addr. The logic circuit 420 can determine whether the hit address ADDRH outputted from the control circuit 410 matches an address requested by a prefetch candidate in the storage space 430. If the hit address ADDRH matches an address requested by a prefetch candidate in the storage space 430, the data processing method proceeds to step 610. Otherwise, the data processing method proceeds to step 640.

In step 610, the logic circuit 420 can increment a count value stored in the counter field CNT corresponding to the prefetch candidate.

In step 612, the logic circuit 420 can determine whether the count value of the prefetch candidate reaches a threshold. If the count value of the prefetch candidate reaches the threshold, the data processing method proceeds to step 614. Otherwise, the data processing method proceeds to step 640.

In step 614, the logic circuit 420 can generate a prefetch command (e.g. the read request RR including the prefetch address ADDRP) according to the address requested by the prefetch candidate and a trend of change in load instructions, and accordingly perform data prefetching upon the memory 240. The logic circuit 420 may further clear the content related to the prefetch candidate in the storage space 430.

In step 618, the control circuit 410 can determine whether the load instruction is a load-use instruction according to the indication signal lu_instr. If yes, proceed to step 620. Otherwise, proceed to step 630.

In step 620, the control circuit 410 can store the address addr in a storage space of the control circuit 410 (not shown in FIG. 4).

In step 622, the logic circuit 420 can determine whether the load instruction is a prefetch candidate according to the indication signal pre_cand. If yes, proceed to step 624. Otherwise, proceed to step 630.

In step 622, the logic circuit 420 can store information on the prefetch candidate in the storage space 430. The information on the prefetch candidate includes an address requested by the prefetch candidate, a count value of the prefetch candidate, and a trend of change in respective address offsets of load instructions related to the prefetch candidate.

In step 630, the logic circuit 420 can send the read request RR to the memory 240. The read request RR may include the address addr and the prefetch address ADDR P.

In step 632, the memory 240 may check if the data requested by the read request RR is stored therein. If it is checked that the data requested by the read request RR is stored in the memory 240, the data processing method proceeds to step 634. Otherwise, the data processing method proceeds to step 636. For example, if it is checked that the memory 240 stores an address matching the address addr (or the prefetch address ADDRP), it is determined that the data requested by the read request RR is stored in the memory 240.

In step 634, the memory 240 may send the data MD1, pointed to by the address addr in the memory 240, back to a pipeline core such as the instruction decode unit 122. The data MD1 serves as the data requested by the read request RR.

In step 636, the data buffer 138 can send the read request RR to the external memory 260 though the bus interface unit 254, thereby reading the data MD2 pointed to by the address addr (or the prefetch address ADDRP) in the memory 260. The data MD2 serves as the data requested by the read request RR.

In step 640, the load instruction is completed. As those skilled in the art can appreciate the operations in each step shown in FIG. 6 after reading the above paragraphs directed to FIG. 1 to FIG. 5, further description is omitted here for brevity.

Figure 7:
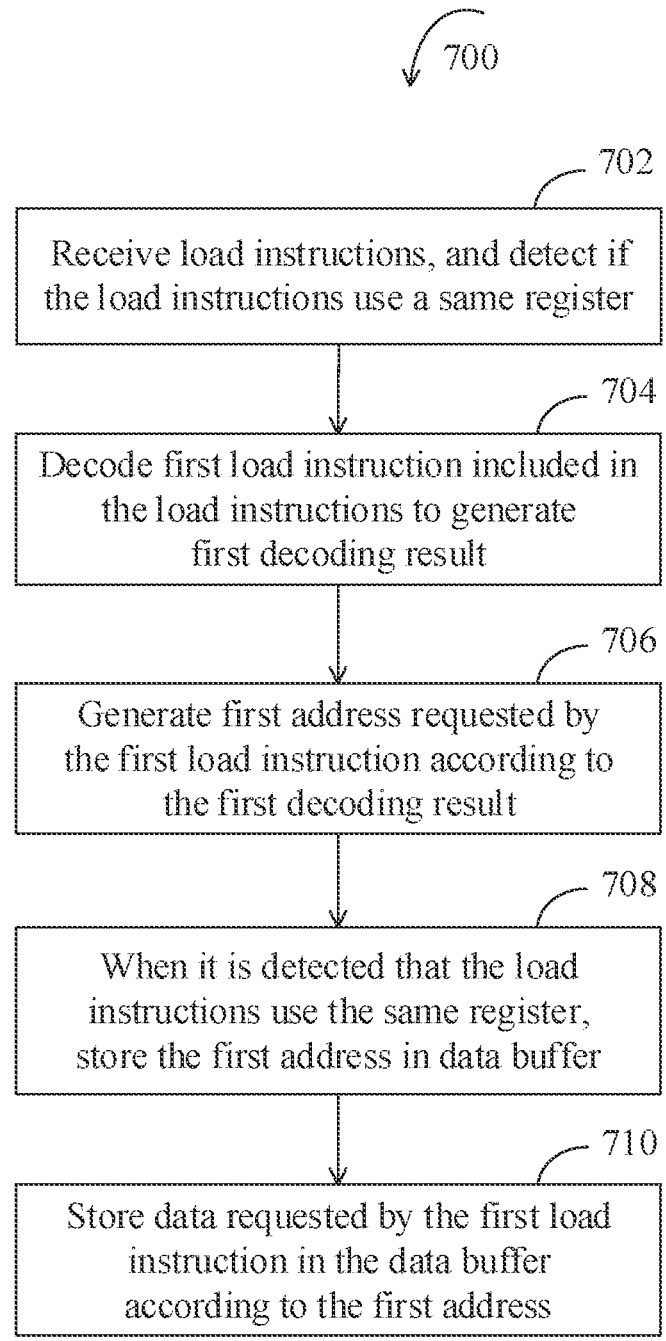
FIG. 7 is a flow chart of an exemplary data processing method in accordance with some embodiments of the present disclosure.

The proposed data processing scheme may be summarized in FIG. 7. FIG. 7 is a flow chart of an exemplary data processing method in accordance with some embodiments of the present disclosure. The data processing method 700 is described with reference to the processor circuit 200 shown in FIG. 2. However, those skilled in the art can understand that the data processing method 700 can be used to control the processor circuit 100 shown in FIG. 1 without departing from the scope of the present disclosure. Additionally, in some embodiments, other operations may be performed in the data processing method 700. In some embodiments, operations of the data processing method 700 may be performed in a different order and/or vary.

In step 702, a plurality of load instructions are received and detected to determine whether the load instructions use a same register. For example, the instruction detector 124 may the load instructions instrL.0-instrL.x, and detect if the load instructions instrL.0-instrL.x use a same register. In some embodiments, the load instructions instrL.0-instrL.x detected by the instruction decode unit 122 can be decoded within a single clock cycle. In some embodiments, the instruction detector 124 can detect whether the load instructions instrL.0-instrL.x use a same base register. Each load instruction can use the base register and a corresponding address offset for addressing.

In step 704, a first load instruction included in the load instructions is decoded to generate a first decoding result.

For example, the instruction decode unit 122 can decode the load instruction instrL.0 to generate a corresponding decoding result.

In step 706, a first address requested by the first load instruction is generated according to the first decoding result. For example, the address generator 136 can generate an address requested by the load instruction instrL.0 according to the decoding result of the load instruction instrL.0.

In step 708, when it is detected that the load instructions use the same register, the first address is stored in a data buffer. For example, when the instruction detector 124 detects that the load instructions instrL.0-instrL.x use the same register, the data buffer 138 can store the address requested by the load instruction instrL.0 according to the indication signal lu_instr. In some cases where the load instructions instrL.0-instrL.x use the same base register but have different address offsets, the load instruction instrL.0 may be a load instruction using a smallest or largest address offset among the load instructions instrL.0-instrL.x.

In step 710, data requested by the first load instruction is stored in the data buffer according to the first address. For example, the data buffer 138 can read the memory 240 according to the address requested by the load instruction instrL.0, thereby obtaining the data requested by the load instruction instrL.0. In some embodiments, the data buffer 138 can read in advance the data, pointed to by an address adjacent to the address requested by the load instruction instrL.0 in the memory 240, according to the address requested by the load instruction instrL.0.

As those skilled in the art can appreciate the operations in each step of the data processing method 700 after reading the above paragraphs directed to FIG. 1 to FIG. 6, further description is omitted here for brevity.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A processor circuit, comprising:
an instruction decode unit, configured to decode a first load instruction included in a plurality of load instructions to generate a first decoding result;
an instruction detector, coupled to the instruction decode unit, the instruction detector being configured to generate an indication signal by detecting if the load instructions use a same register;
an address generator, coupled to the instruction decode unit, the address generator being configured to generate a first address requested by the first load instruction according to the first decoding result; and
a data buffer, coupled to the instruction detector and the address generator, the data buffer being configured to selectively store the first address generated by the address generator according to the indication signal, wherein when the indication signal indicates the first load instruction is one of the load instructions using the same register, the data buffer is configured to store the first address generated from the address generator, and store data requested by the first load instruction according to the first address.

2. The processing circuit of claim 1, wherein the instruction decode unit is configured to receive the load instructions within consecutive clock cycles.

3. The processing circuit of claim 1, wherein the register is a base register shared by the load instructions, and each of the load instructions uses the base register and a corresponding address offset for addressing.

4. The processing circuit of claim 3, wherein the first load instruction is a load instruction using a smallest address offset among the load instructions.

5. The processing circuit of claim 3, wherein the instruction detector is further configured to determine whether the first load instruction is a prefetch candidate by detecting a trend of change in respective address offsets of the load instructions sharing the base register; when it is determined that the first load instruction is the prefetch candidate, the data buffer is configured to read data requested by at least one load instruction included in the load instructions from a memory; the at least one load instruction is different from the first load instruction.

6. The processing circuit of claim 5, wherein when detecting that the trend of change is an ascending trend or a descending trend, the instruction detector determines that the first load instruction is the prefetch candidate.

7. The processing circuit of claim 5, wherein when the instruction detector determines that the first load instruction is the prefetch candidate, the data buffer is configured to count a number of instructions different from the first load instructions among the load instructions, and accordingly determine a count value of the prefetch candidate; when the count value reaches a threshold, the data buffer is configured to read the data, requested by the at least one load instruction, from the memory according to the first address and the trend of change.

8. The processing circuit of claim 7, wherein the instruction decode unit is further configured to decode a second load instruction included in the load instructions to generate a second decoding result, and the second load instruction is different from the first load instruction; the address generator is configured to generate a second address requested by the second load instruction according to the second decoding result; the data buffer comprises:
a control circuit, coupled to the address generator, the control circuit being configured to determine whether the second address matches the first address, and output the first address when the second address matches the first address; and
a logic circuit, coupled to the instruction detector, the address generator and the control circuit, the logic circuit being configured to store the first address and the trend of change when the instruction detector determines that the first load instruction is the prefetch candidate, and increment the count value when the second address outputted from the control circuit matches the first address.

9. The processing circuit of claim 7, wherein when the count value reaches the threshold, the data buffer is configured to generate a prefetch address according to the first address and the trend of change, and read data pointed to by the prefetch address in the memory; the data pointed to by the prefetch address in the memory is data requested by a third load instruction included in the load instructions; the third load instruction is different from the first load instruction and the second load instruction.

10. The processing circuit of claim 1, wherein the first address is an address stored in the register.

11. A data processing method, comprising:
- receiving a plurality of load instructions, and generating an indication signal by detecting if the load instructions use a same register;
- decoding a first load instruction included in the load instructions to generate a first decoding result;
- generating a first address requested by the first load instruction according to the first decoding result;
- selectively storing the first address generated by the address generator according to the indication signal, wherein when the indication signal indicates the first load instruction is one of the load instructions using the same register, the first address requested by the first load instruction is stored in a data buffer; and
- when the indication signal indicates the first load instruction is the one of the load instructions using the same register, storing data requested by the first load instruction in the data buffer according to the first address.

12. The data processing method of claim 11, wherein the load instructions are received within consecutive clock cycles.

13. The data processing method of claim 11, wherein the register is a base register shared by the load instructions, and each of the load instructions uses the base register and a corresponding address offset for addressing.

14. The data processing method of claim 13, wherein the first load instruction is a load instruction using a smallest address offset among the load instructions.

15. The data processing method of claim 13, further comprising:
- determining whether the first load instruction is a prefetch candidate by detecting a trend of change in respective address offsets used by the load instructions sharing the base register; and
- when it is determined that the first load instruction is the prefetch candidate, reading data requested by at least one load instruction included in the load instructions from a memory, wherein the at least one load instruction is different from the first load instruction.

16. The data processing method of claim 15, wherein the step of determining whether the first load instruction is the prefetch candidate comprises:
- when it is detected that the trend of change is an ascending trend or a descending trend, determining that the first load instruction is the prefetch candidate.

17. The data processing method of claim 15, wherein the step of reading the data requested by the at least one load instruction from the memory comprises:
- counting a number of instructions different from the first load instructions among the load instructions, and accordingly determining a count value of the prefetch candidate; and
- when the count value reaches a threshold, reading the data, requested by the at least one load instruction, from the memory according to the first address and the trend of change.

18. The data processing method of claim 17, wherein the step of counting the number of instructions different from the first load instructions among the load instructions and accordingly determining the count value of the prefetch candidate comprises:
- decoding a second load instruction included in the load instructions to generate a second decoding result, the second load instruction being different from the first load instruction;
- generating a second address requested by the second load instruction according to the second decoding result;
- determining whether the second address matches the first address, and outputting the first address when the second address matches the first address; and
- when the second address outputted from the control circuit matches the first address, incrementing the count value.

19. The data processing method of claim 17, wherein the step of reading the data requested by the at least one load instruction from the memory according to the first address and the trend of change comprises:
- generating a prefetch address according to the first address and the trend of change, and reading data pointed to by the prefetch address in the memory, wherein the data pointed to by the prefetch address in the memory is data requested by a third load instruction included in the load instructions, and the third load instruction is different from the first load instruction and the second load instruction.

20. The data processing method of claim 11, wherein the first address is an address stored in the register.

* * * * *